United States Patent
Romeo

(10) Patent No.: US 11,005,365 B2
(45) Date of Patent: May 11, 2021

(54) POWER CONVERTER USING HYSTERETIC BOOST ARCHITECTURE AND METHOD THEREFOR

(71) Applicant: SEMICONDUCTOR COMPONENTS INDUSTRIES, LLC, Phoenix, AZ (US)

(72) Inventor: Dominique Romeo, Montauban (FR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 806 days.

(21) Appl. No.: 14/686,970

(22) Filed: Apr. 15, 2015

(65) Prior Publication Data

US 2015/0381037 A1    Dec. 31, 2015

Related U.S. Application Data

(60) Provisional application No. 62/017,074, filed on Jun. 25, 2014.

(51) Int. Cl.
*H02M 3/156* (2006.01)
*H02M 1/00* (2006.01)

(52) U.S. Cl.
CPC .... *H02M 3/156* (2013.01); *H02M 2001/0025* (2013.01); *H02M 2001/0032* (2013.01); *Y02B 70/10* (2013.01)

(58) Field of Classification Search
CPC ......... H02M 3/156; H02M 2001/0009; H02M 3/1563; H02M 3/1584; H02M 3/1588;
(Continued)

(56) References Cited

U.S. PATENT DOCUMENTS 5,770,940 A * 6/1998 Goder ..................... G05F 1/565
                                                         323/282
6,147,478 A * 11/2000 Skelton ............... H02M 3/1563
                                                         323/284
(Continued)

OTHER PUBLICATIONS

Jhih-Sian Guo, Shih-Mei Lin and Chien-Hung Tsai, "A Hysteretic Boost Regulator with Emulated-Ramp Feedback (ERF) Current-Sensing Technique for LED Driving Applications," 2013 IEEE Asian Solid-State Circuits Conference (A-SSCC), Nov. 2013, pp. 61-64.
(Continued)

*Primary Examiner* — Jeffrey A Gblende
*Assistant Examiner* — Henry E Lee, III
(74) *Attorney, Agent, or Firm* — Polansky & Associates, P.L.L.C.; Paul J. Polansky

(57) ABSTRACT

In one form, a control circuit is adapted for use with a power converter having an inductor and a switch switching the inductor in response to a switching signal to regulate an output voltage of the power converter. The control circuit includes a slow feedback path, a fast feedback path, an integrator, a comparator, and a drive circuit. The slow feedback path provides a ripple signal in response to an average value of the output voltage. The fast feedback path provides a feedback signal in response to the output voltage. The integrator provides an error signal in response to a sum of the feedback signal and the ripple signal. The comparator provides a comparison output signal in response to a comparison of the error signal and a threshold voltage. The driver circuit provides the switching signal in response to the comparison output signal.

13 Claims, 4 Drawing Sheets

(58) Field of Classification Search
CPC . H02M 2001/0025; H02M 2001/0032; H02M 2001/0045; H02M 3/3385; Y02B 70/1466
See application file for complete search history.

(56) References Cited

U.S. PATENT DOCUMENTS

| | | | |
|---|---|---|---|
| 2007/0013353 A1* | 1/2007 | Noma | H02M 3/1588 323/284 |
| 2008/0088292 A1* | 4/2008 | Stoichita | H02M 3/156 323/285 |
| 2013/0249508 A1* | 9/2013 | Rahimi | G05F 1/625 323/271 |
| 2014/0084888 A1* | 3/2014 | Kim | H02M 3/157 323/283 |
| 2014/0225578 A1* | 8/2014 | Lin | H02M 3/156 323/271 |

OTHER PUBLICATIONS

Xiao-ru Xu, Meng-lian Zhao and Xiao-bo Wu, "On-chip boost regulator with projected off- and on-time control," 2009, Project No. 90707002 of the National Natural Science Foundation of China, pp. 1223-1230.

Arnold Knott, Gerhard R. Pfaffinger and Michael A. E. Andersen, "A Self-Oscillating Control Scheme for a Boost Converter Providing a Controlled Output Current," IEEE Transactions on Power Electronics, vol. 26, No. 9, Sep. 2011, pp. 2707-2723.

* cited by examiner

POWER CONVERTER USING HYSTERETIC BOOST ARCHITECTURE AND METHOD THEREFOR

FIELD OF THE DISCLOSURE

The present disclosure relates generally to power conversion circuits, and more particularly to boost converters.

BACKGROUND

Boost converters are power converters that convert one direct current (DC) voltage into another, higher DC voltage. Boost converters typically regulate the output voltage by switching a transistor connected to an inductor to create a magnetic field across the inductor according to the level of the output voltage. If the switching transistor is connected in series between the inductor and ground, the switching transistor is referred to as a low side switch (LSS). The second terminal of the inductor is connected to a rectifier, and the rectified voltage is smoothed using an output capacitor. The switching of the transistor can be controlled by creating an error voltage that is the difference between the output voltage or some fraction of the output voltage and a reference voltage.

Boost converters typically operate under a variety of load conditions. Typically boost converters lose efficiency under light load conditions, but light load conditions are becoming more frequent as powered devices adopt so-called "eco-mode" operation. Since the load transitions to and from the light load condition suddenly, the boost mode power supply preferably provides good load transient performance. Moreover since the input voltage can vary over a wide range, which includes being close to or equal to the desired output voltage, it is desirable for the converter to operate in either boost or buck operation. In addition, product cost including the cost of external components associated with the boost converter is an important consideration.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

Figure 1:
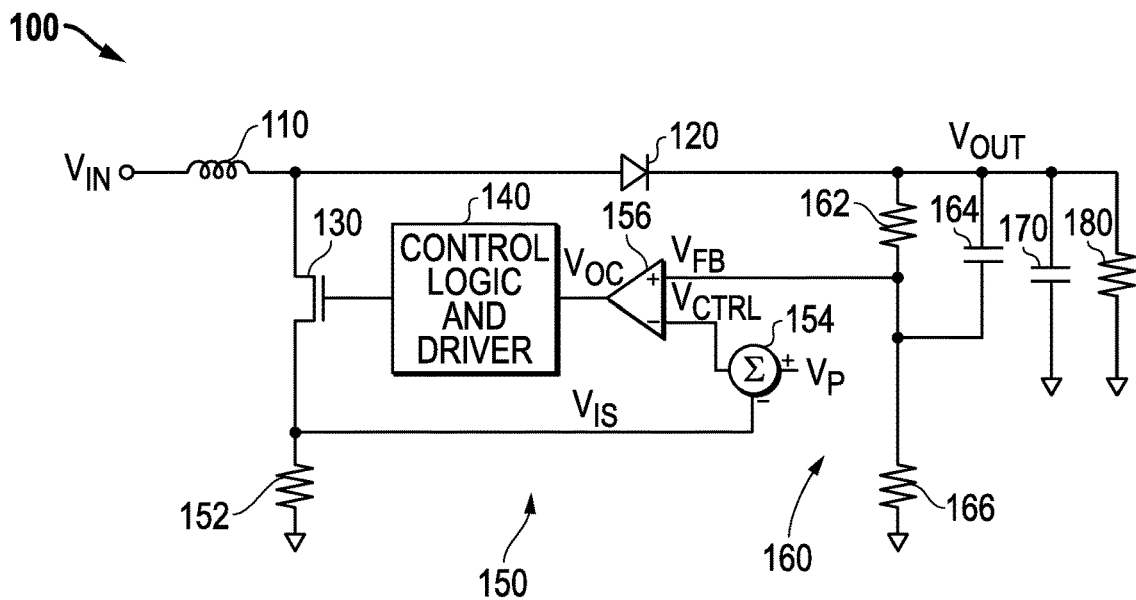
FIG. 1 illustrates in partial block diagram and partial schematic form a boost regulator known in the prior art.

FIG. 1 illustrates in partial block diagram and partial schematic form a boost regulator 100 known in the prior art. Boost regulator 100 is described by Xu, Zhao, and Wu in "On-Chip Boost Regulator with Projected Off- and On-time Control," *Journal of Zhejiang University*, vol. 10, no. 8, 2009, pages 1223-1230.

Boost regulator 100 includes an inductor 110, a diode 120, an N-channel MOS transistor 130, a control logic and driver circuit 140, a control circuit 150, an output portion 160, an output capacitor 170, and a load 180. Inductor 110 has a first terminal for receiving an input voltage labeled "$V_{IN}$", and a second terminal. Diode 120 has an anode connected to the second terminal of inductor 110, and a cathode for providing a voltage labeled "$V_{OUT}$". Transistor 130 has a drain connected to the second terminal of inductor 110, a gate, and a source. Control logic and driver circuit 140 has an input for receiving a control voltage labeled "$V_{OC}$", and an output connected to the gate of transistor 130. Control circuit 150 includes a resistor 152, a summing device 154, and a comparator 156. Resistor 152 has a first terminal connected to the source of transistor 130 forming a voltage labeled "$V_{IS}$", and a second terminal connected to ground. Summing device 154 has a positive input terminal for receiving a voltage labeled "$V_P$", a negative input terminal for receiving voltage $V_{IS}$, and an output for providing a voltage labeled "$V_{CTRL}$". Comparator 156 has a non-inverting input for receiving a feedback voltage labeled "$V_{FB}$", an inverting input for receiving voltage $V_{IS}$, and an output for providing voltage $V_{OC}$. Output portion 160 includes a resistor 162, a capacitor 164, and a resistor 166. Resistor 162 has a first terminal connected to the cathode of diode 120, and a second terminal for providing voltage $V_{FB}$. Capacitor 164 has a first terminal connected to the cathode of diode 120, and a second terminal connected to the second terminal of resistor 162. Resistor 166 has a first terminal connected to the second terminals of resistor 162 and capacitor 164, and a second terminal connected to ground. Output capacitor 170 has a first terminal connected to the cathode of diode 120, and a second terminal connected to ground. FIG. 1 illustrates load 180 as a resistor 180 having a first terminal connected to the cathode of diode 120, and a second terminal connected to ground.

Boost regulator 100 uses projected off- and on-time control. With the projected off-time control, the switch off-time is calculated based on the input and output voltage aiming at quasi fixed frequency operation in continuous conduction mode (CCM) as fixed frequency operation is preferred for ripple control. In consideration of efficiency in discontinuous conduction mode (DCM) operation, the projected on-time combined with modulated off-time enables boost regulator 100 to run in pulse frequency modulation (PFM) operation automatically without additional control circuits.

While the implementation of boost regulator 100 is simple, it requires current sensing which decreases efficiency. Also the off-time and on-time generators contribute to quiescent current. Moreover the off time for CCM and the on-time for DCM require transition mode management.

Figure 2:
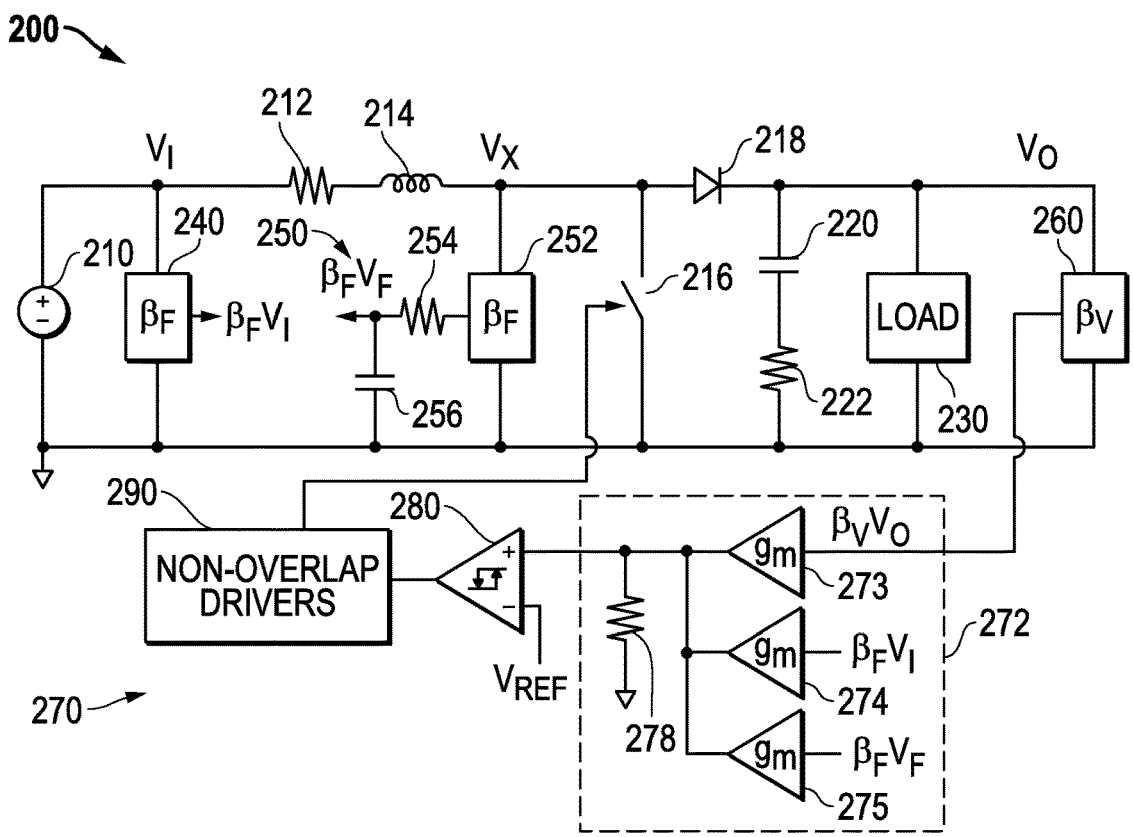
FIG. 2 illustrates in partial block diagram and partial schematic form another boost regulator known in the prior art.

FIG. 2 illustrates in partial block diagram and partial schematic form another boost regulator 200 known in the prior art. Boost regulator 200 is described by Guo, Lin, and Tsai in "A hysteretic Boost Regulator with Emulated-Ramp Feedback (ERF) Current-Sensing Technique for LED Driving Applications," *IEEE Transactions on Power Electronics*, vol. 26, no. 9, September 2011.

Boost regulator 200 includes a voltage source 210, a resistor 212, an inductor 214, a switch 216, a diode 218, a capacitor 220, a resistor 222, a load 230, a feedback network 240, a feedback circuit 250, a feedback circuit 260, and a control circuit 270. Voltage source 210 has a first terminal for providing an input voltage labeled "$V_I$", and a second terminal connected to ground. Resistor 212 has a first terminal connected to the first terminal of voltage source 210, and a second terminal. Inductor 214 has a first terminal connected to the second terminal of resistor 212, and a second terminal for providing a voltage labeled "$V_X$". Switch 216 has a first terminal connected to the second terminal of inductor 214, a second terminal connected to ground, and a control terminal. Diode 218 has an anode connected to the second terminal of inductor 214, and a cathode for providing an output voltage labeled "$V_O$". Capacitor 220 has a first terminal connected to the cathode of diode 218, and a second terminal. Resistor 222 has a first terminal connected to the second terminal of capacitor 220, and a second terminal connected to ground. Load 230 has a first terminal connected the cathode of diode 218, and a second terminal connected to ground. Feedback network 240 has a first terminal connected to the first terminal of voltage source 210, a second terminal connected to ground, and an output terminal for providing a signal labeled "$\beta_F V_I$". Feedback network 250 includes a divider 252, a resistor 254, and a capacitor 256. Divider 252 has a first terminal connected to the first terminal of voltage source 210, a second terminal connected to ground, and an output terminal. Resistor 254 has a first terminal connected to the output terminal of divider 252, and a second terminal for providing a signal labeled "$\beta_F V_F$". Capacitor 256 has a first terminal connected to the second terminal of resistor 254, and a second terminal connected to ground. Feedback network 260 has a first terminal connected to the cathode of diode 218, a second terminal connected to ground, and an output terminal for providing a signal labeled "$\beta_V V_O$".

Control circuit 270 includes an emulated ramp feedback (ERF) generator 272, a hysteretic comparator 280, and non-overlap drivers 290. ERF generator 272 includes operational transconductance amplifiers (OTAs) 273-275, each labeled "gm", and a resistor 278. Transconductance amplifier 273 has an input for receiving signal $\beta_V V_O$, and an output. Transconductance amplifier 274 has an input for receiving signal $\beta_F V_I$, and an output connected to the output of transconductance amplifier 273. Transconductance amplifier 275 has an input for receiving signal "$\beta_F V_F$", and an output connected to the outputs of transconductance amplifiers 273 and 274. Resistor 278 has a first terminal connected to the outputs of transconductance amplifiers 273-275, and a second terminal connected to ground. Hysteretic comparator 280 has a non-inverting input connected to the outputs of transconductance amplifiers 273-275, an inverting input for receiving a reference voltage labeled "$V_{REF}$", and an output. Non-overlap drivers 290 have an input connected to the output of hysteretic comparator 280, and an output connected to the control terminal of switch 216.

In operation, control circuit 270 of boost regulator 200 only consists of three portions, including an emulated ramp feedback (ERF) generator 272, a hysteretic comparator 280, and non-overlap drivers 290. The goal of the ERF current-sensing technique is to synthesize a ramp which is in-phase with a small signal of inductor current and with a DC level of the output voltage. This current-sensing technique consists of one RC network and one ERF generator.

Boost regulator 200 does not require current sensing or any timing generation. However boost regulator 200 requires three OTAs, causing a large quiescent current, and has been implemented using a switching speed of 566 kilohertz (kHz).

Figure 3:
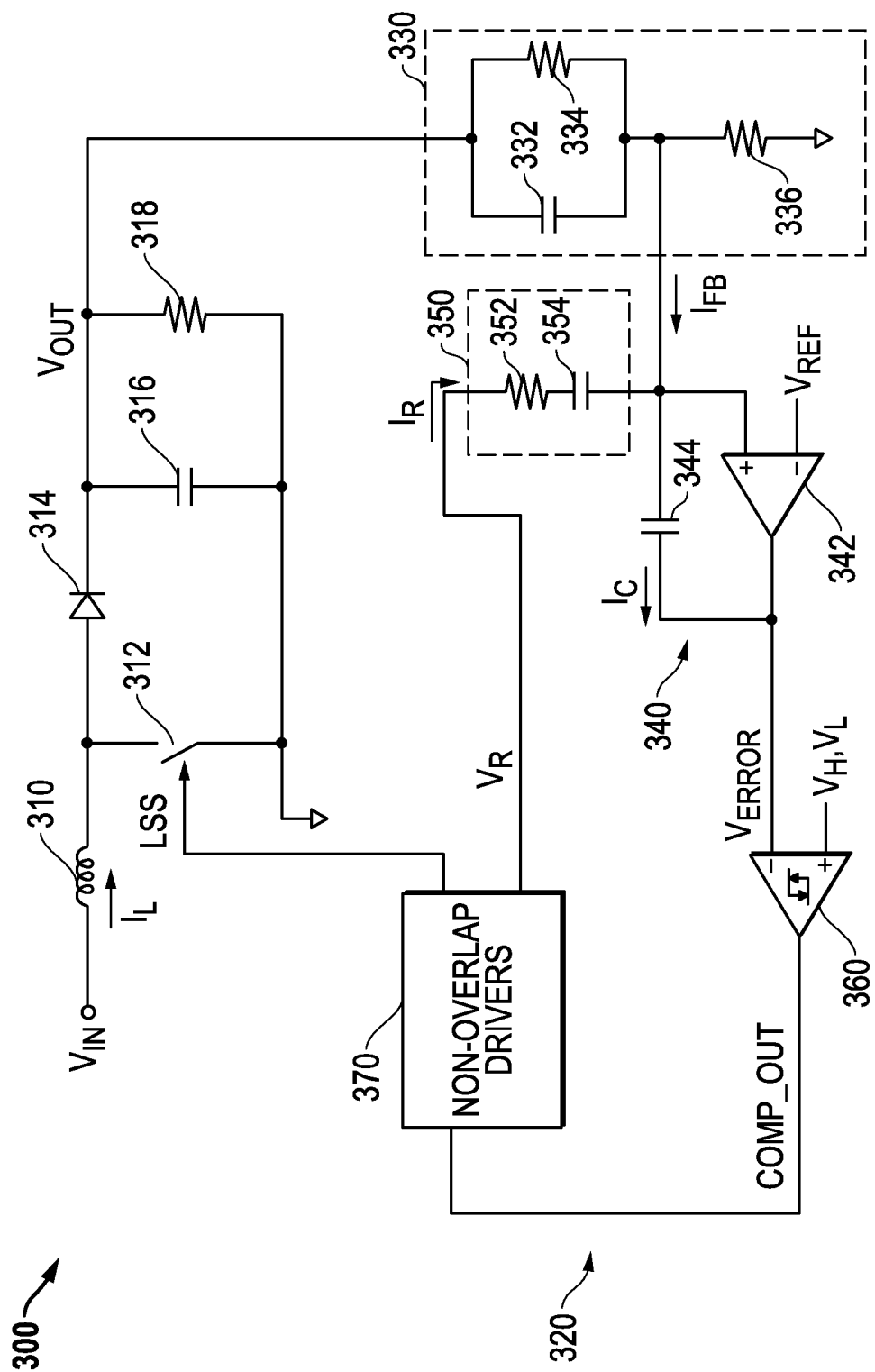
FIG. 3 illustrates in partial block diagram and partial schematic form a power converter using a hysteretic boost converter according to an embodiment of the present invention.

FIG. 3 illustrates in partial block diagram and partial schematic form a power converter 300 using a hysteretic boost converter according to an embodiment of the present invention. Power converter 300 includes generally an inductor 310, a low side switch 312, a diode 314, an output capacitor 316, a load 318, and a control circuit 320. Inductor 310 has a first terminal for receiving an input voltage labeled "$V_{IN}$", and a second terminal. Low side switch 312 has a first terminal connected to the second terminal of inductor 310, a second terminal connected to ground, and a control terminal. Diode 314 has an anode connected to the second terminal of inductor 310, and a cathode for providing an output voltage labeled "$V_{OUT}$". Capacitor 316 has a first terminal connected to the cathode of diode 314, and a second terminal connected to ground. Load 318 is shown as a purely resistive load having a first terminal connected to the cathode of diode 314, and a second terminal connected to ground.

Control circuit 320 includes a feedback network 330, an integrator 340, a ripple emulator 350, a hysteresis comparator 360, and a set of non-overlap drivers 370. Feedback network 330 includes a capacitor 332, a resistor 334, and a resistor 336. Capacitor 332 has a first terminal connected to the cathode of diode 314, and a second terminal. Resistor 334 has a first terminal connected to the cathode of diode 314, and a second terminal connected to the second terminal of capacitor 332. Resistor 336 has a first terminal connected to the second terminals of capacitor 332 and resistor 334, and a second terminal connected to ground.

Integrator 340 includes an operational amplifier 342 and a capacitor 344. Operational amplifier 342 has an inverting input connected to the second terminals of capacitor 332 and resistor 334, a non-inverting input terminal for receiving a reference voltage labeled "$V_{REF}$", an output terminal for providing a signal labeled "$V_{ERROR}$". Capacitor 344 has a first terminal connected to the inverting input of operational amplifier 342, and a second terminal connected to the output of operational amplifier 342.

Ripple emulator 350 includes a resistor 352 and a capacitor 354. Resistor 352 has first and second terminals. Capacitor 354 has a first terminal connected to the second terminal of resistor 352, and a second terminal connected to the inverting input of operational amplifier.

Hysteresis comparator 360 has an inverting input connected to the output of operational amplifier 342 for receiving the $V_{ERROR}$ signal, a non-inverting input for receiving high and low hysteretic thresholds labeled "$V_H$" and "$V_L$", respectively, and an output terminal for providing a signal labeled "COMP_OUT".

Non-overlap drivers 370 have an input connected to the output of hysteresis comparator 360, a first output connected to the control input of low side switch 312 for providing a switching signal labeled "LSS", and a second output connected to the first terminal of resistor 352 for providing a signal labeled "$V_R$" which is a voltage representative of switching signal LSS.

Power converter 300 implements a step-up DC-DC (i.e. boost) converter controlled by integrator 340 monitoring $V_{OUT}$ through feedback network 330 combined with ripple emulator 350, and a hysteresis comparator 360. Current into integrator 340 ($I_C$) is equal to the sum of the current from feedback network 330 ($I_{FB}$) and current from ripple emulator 350 ($I_R$):

$$I_C = I_R + I_{FB} \qquad [1]$$

Power converter 300 is controlled based on a slow feedback path (DC regulation) and a fast feedback path (load transient response). The slow feedback path is provided by ripple emulator 350, while the fast feedback path is provided by feedback network 330 using capacitor 332 operating as a feedforward capacitor.

Figure 4:
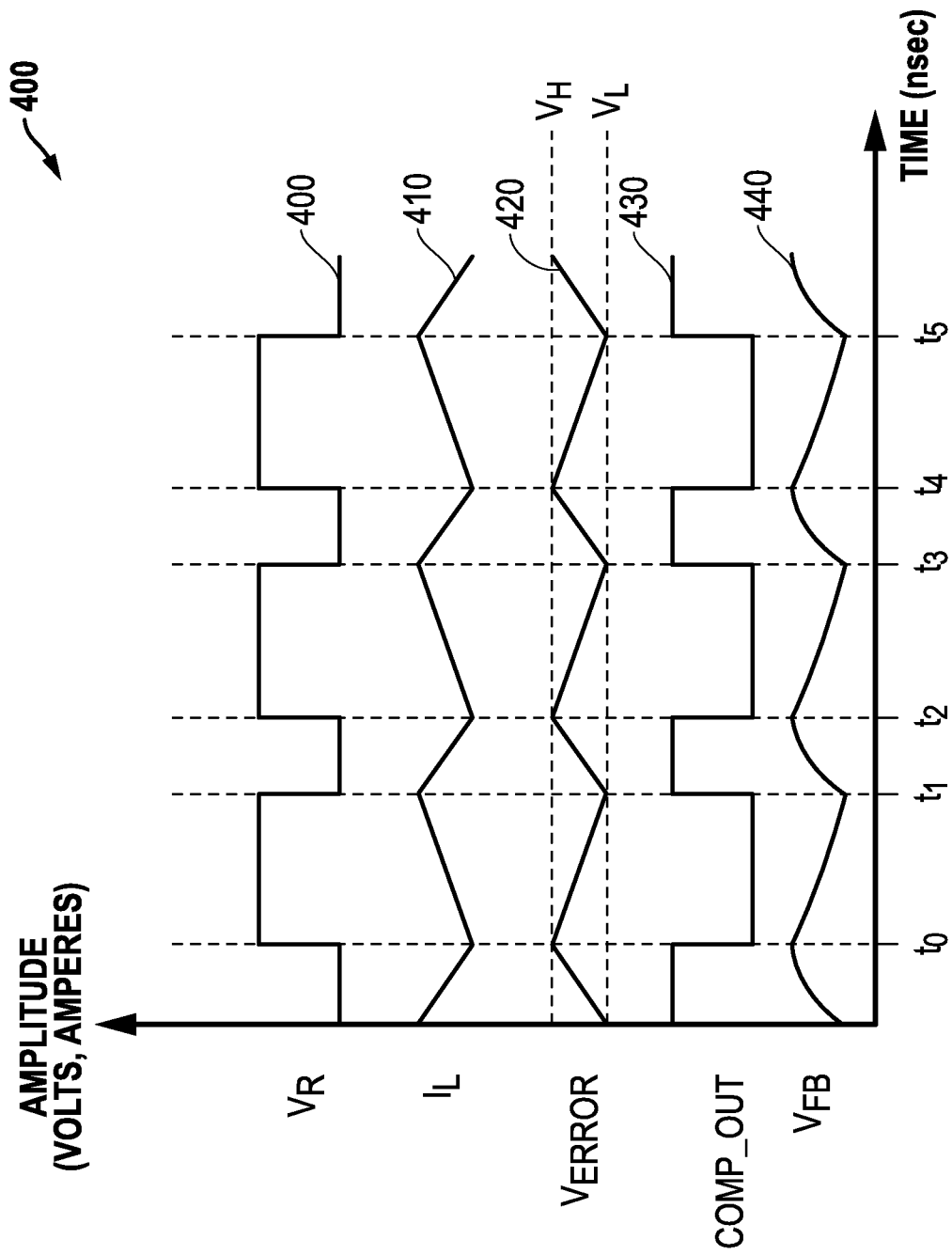
FIG. 4 illustrates a timing diagram associated with a slow feedback path of the boost converter of FIG. 3.

FIG. 4 illustrates a timing diagram 400 associated with a slow feedback path of power converter 300 of FIG. 3. In FIG. 4, the horizontal axis represents time in nanoseconds (ns), and the vertical axis amplitude of various signals in volts or amperes as the case may be. Timing diagram 400 shows five signals of interest, including $V_R$, $I_L$, $V_{ERROR}$, COMP_OUT, and $V_{FB}$.

FIG. 4 also illustrates various time points of interest, including times labeled "$t_0$", "$t_1$", "$t_2$", "$t_3$", "$t_4$", and "$t_5$", which delineate ON and OFF phases corresponding to ON and OFF times of low side switch 312, respectively. During the ON phase, for example between times $t_0$ and $t_1$, $t_2$ and $t_3$, $t_4$ and $t_5$, non-overlap drivers 370 provide signal LSS at a high voltage to close low side switch 312, and also provide signal $V_R$ at a high level to the first terminal of ripple emulator 350. During the ON phase, inductor current $I_L$ rises, currents $I_R$ and $I_C$ are positive, and signal $V_{ERROR}$ decreases until it reaches the low threshold level $V_L$. When $V_{ERROR}$ becomes less than $V_L$, hysteresis comparator 360 switches its output to a logic high, causing non-overlap drivers 370 to deactivate signal LSS, and power converter 300 begins the OFF phase.

During the OFF phase, for example between times $t_1$ and $t_2$, $t_3$ and $t_4$, and after $t_5$, non-overlap drivers 370 provide signal LSS at a logic low voltage to open low side switch 312, and also provide signal $V_R$ at a logic low to the first input of ripple emulator 350. Inductor current $I_L$ falls during the OFF phase, currents $I_R$ and $I_C$ are negative, and signal $V_{ERROR}$ increases until it reaches the high threshold $V_H$. When $V_{ERROR}$ exceeds the high threshold $V_H$, power converter 300 again switches to the ON period.

During the ON phase, when the low side switch 312 is ON, the current in inductor 310 is increasing, thus a voltage $V_R$ is applied to ripple emulator 350 causing an increase current in capacitor 344 and a decrease of signal $V_{ERROR}$.

When the error voltage crosses the threshold low, $V_L$, of hysteresis comparator 360, the comparator triggers and the LSS is turned OFF, meaning the end of the $T_{ON}$ phase, and if a high side switch (HSS) is used in place of diode 314, the HSS is turned ON, meaning the start of a $T_{OFF}$ phase.

Figure 5:
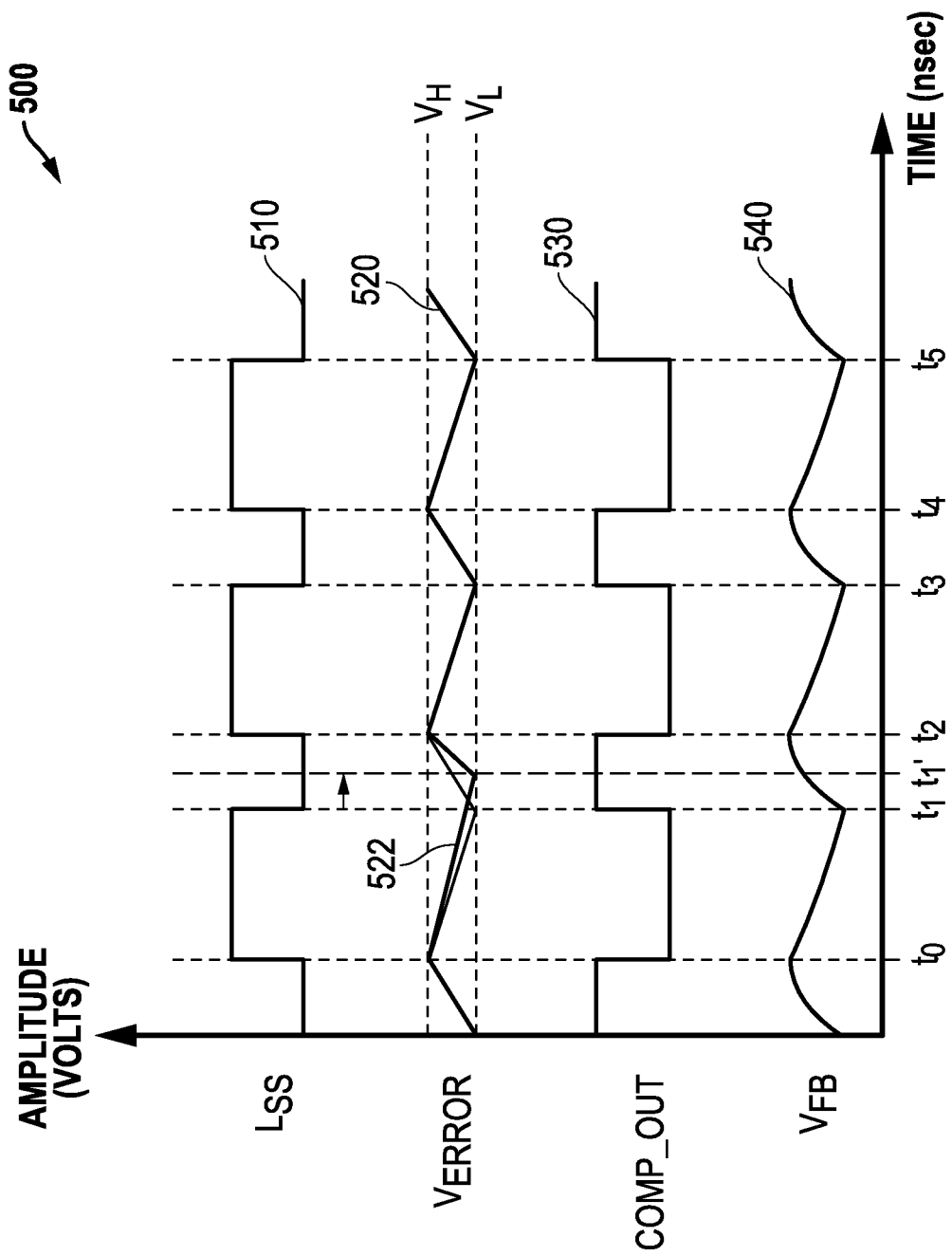
FIG. 5 illustrates a timing diagram associated with a fast feedback path of the boost converter of FIG. 3.

FIG. 5 illustrates a timing diagram 500 associated with a fast feedback path of power converter 300 of FIG. 3. In FIG. 5, the horizontal axis represents time in ns, and the vertical axis amplitude of various signals in volts. Timing diagram 500 shows four signals of interest, including LSS, $V_{ERROR}$, COMP_OUT, and $V_{FB}$.

FIG. 5 also illustrates the same time points of interest, including times $t_0$, $t_1$, $t_2$, $t_3$, $t_4$, and $t_5$, which delineate ON and OFF phases corresponding to ON phases of low side switch 312 and OFF phases of low side switch 312, respectively. During the ON phase, for example between times $t_0$ and $t_1$, $t_2$ and $t_3$, $t_4$ and $t_5$, non-overlap drivers 370 provide signal LSS at a logic high to close low side switch 312. As low side switch 312 operates to increase $I_L$, it also decreases $V_{OUT}$ and also $V_{FB}$ and $I_{FB}$. This reduction in $I_{FB}$ decreases $V_{ERROR}$ until, at time $t_1$, $V_{ERROR}$ is less than low threshold level $V_L$.

During an increase of the load current, the drop in signal $V_{OUT}$ accelerates the current drop in capacitor 344 through capacitor 332. Thus the ON phase will be extended while the OFF phase will be shortened, causing more energy to be stored in the inductor. During the next cycle, signal $V_{OUT}$ will be restored. When $V_{ERROR}$ again exceeds the high threshold $V_H$, power converter 300 switches to the ON phase.

In response to a load transient, for example when the load switches from a light-load condition to a full load condition, signal $V_{OUT}$ decreases suddenly. The sudden decrease in $V_{OUT}$ causes in increase in current $I_{FB}$, which causes $V_{ERROR}$ to decrease more slowly, and hence to lengthen the ON time such that the new ON time is between t0 and a new time labeled "$t_1'$". Thus the fast feedback path improves the load transient response of power converter 300.

Power converter 300 also provides an "eco mode". During light load operation, diode 314 prevents a negative current from inductor 310 (i.e. a current flowing in the reverse direction from the second terminal to the first terminal thereof). In an alternate embodiment, diode 314 may be replaced by a synchronous rectifier. In the synchronous version, a zero crossing detector prevents reverse current flow using zero crossing detection to turn off the synchronous rectifier (i.e. the HSS). In either case, the energy stored during the ON phase is not completely absorbed by the load, and the output voltage increases during the OFF phase. The rise in the output voltage increases the current in capacitor 344 so the next ON phase will shorten while the OFF will lengthen. When power converter 300 reduces the ON phase to a minimum, it continues to increase the OFF phase in order to maintain output regulation, and the operating frequency will decrease naturally. Thus, power converter 300 improves light load efficiency by reducing switching losses.

Thus power converter 300 includes a current ripple emulator to avoid the need for current sensing, improving converter efficiency. It uses only one operational amplifier, further reducing quiescent current. Moreover power converter 300 has an embedded "eco-mode" using a single loop system with good load transient response.

The above-disclosed subject matter is to be considered illustrative, and not restrictive, and the appended claims are intended to cover all such modifications, enhancements, and other embodiments that fall within the true scope of the claims. For example in other embodiments, diode 314 could be replaced by a synchronous rectifier. Moreover a boost DC-DC converter could be formed using drivers for both a high side switch and a low side switch.

Thus, to the maximum extent allowed by law, the scope of the present invention is to be determined by the broadest permissible interpretation of the following claims and their equivalents, and shall not be restricted or limited by the foregoing detailed description.

What is claimed is:

1. A power converter using a hysteretic boost architecture comprising:
    an inductor having a first terminal for receiving an input voltage, and a second terminal;
    a low-side switch having a first terminal coupled to the second terminal of the inductor, a second terminal coupled to a power supply voltage terminal, and a control terminal for receiving a switching signal;
    a rectifier having a first terminal coupled to the second terminal of the inductor, and a second terminal for providing an output voltage;
    an output capacitor is coupled between the second terminal of the rectifier and the power supply voltage terminal; and a control circuit having an input coupled to the second terminal of the rectifier, and an output coupled to the control terminal of the switch for providing the switching signal, wherein the control circuit provides the switching signal using hysteresis based on both a slow feedback path and a fast feedback path, wherein the slow feedback path comprises a ripple emulation circuit having an input terminal for receiving a voltage having the same logic states as the switching signal, and an output terminal for providing an emulated ripple current representative of a ripple voltage caused by the switching signal, wherein the fast feedback path comprises a feedback network having an input terminal coupled to the second terminal of the rectifier, and an output terminal for providing a feedback current in response to the output voltage, and the feedback network comprises:

a feedforward capacitor having a first terminal coupled to the second terminal of the rectifier, and a second terminal providing the feedback current;

a first resistor having a first terminal coupled to the second terminal of the rectifier, and a second terminal coupled to the second terminal of the feedforward capacitor; and a second resistor having a first terminal coupled to the second terminal of the first resistor and the second terminal of the capacitor, and a second terminal coupled to the power supply voltage terminal.

2. A power converter using a hysteretic boost architecture comprising:

an inductor having a first terminal for receiving an input voltage, and a second terminal;

a low-side switch having a first terminal coupled to the second terminal of the inductor, a second terminal coupled to a power supply voltage terminal, and a control terminal for receiving a switching signal;

a rectifier having a first terminal coupled to the second terminal of the inductor, and a second terminal for providing an output voltage;

an output capacitor is coupled between the second terminal of the rectifier and the power supply voltage terminal; and a control circuit having an input coupled to the second terminal of the rectifier, and an output coupled to the control terminal of the switch for providing the switching signal, wherein the control circuit provides the switching signal using hysteresis based on both a slow feedback path and a fast feedback path, wherein the slow feedback path comprises a ripple emulation circuit having an input terminal for receiving a voltage having the same logic states as the switching signal, and an output terminal for providing an emulated ripple current representative of a ripple voltage caused by the switching signal, wherein the control circuit comprises:

a feedback network for providing a feedback current representative of the output voltage;

an integrator for providing an output thereof based on a sum of the ripple current and the feedback current;

a hysteretic comparator having a first input coupled to the output of the integrator, a second input for receiving at least one reference voltage, and an output; and a driver circuit having an input coupled to the output of the hysteretic comparator, and an output for providing the switching signal.

3. A control circuit for use with a power converter having an inductor and a switch switching the inductor in response to a switching signal to regulate an output voltage of the power converter, comprising:

a slow feedback path for providing a ripple current into a node in response to an average value of the output voltage;

a fast feedback path for providing a feedback current into the node in response to the output voltage;

an integrator for providing an error signal in response to integrating a sum of the feedback current and the ripple current received at the node;

a comparator for providing a comparison output signal in response to a comparison of the error signal and a threshold voltage; and a driver circuit for providing the switching signal in response to the comparison output signal.

4. The power converter of claim 3 wherein the slow feedback path comprises:

a resistor having a first terminal for receiving a voltage corresponding to the switching signal, and a second terminal; and a capacitor having a first terminal coupled to the second terminal of the resistor, and a second terminal for providing the ripple current.

5. The power converter of claim 3 wherein the fast feedback path comprises a feedback network having an input terminal for receiving the output voltage, and an output terminal for providing the feedback current.

6. The power converter of claim 5 wherein the fast feedback path further comprises:

a first resistor having a first terminal for receiving the output voltage, and a second terminal coupled to the node;

a capacitor having a first terminal for receiving the output voltage, and a second terminal coupled to the second terminal of the first resistor; and a second resistor having a first terminal coupled to the second terminal of the first resistor and the second terminal of the capacitor, and a second terminal coupled to a power supply voltage terminal.

7. The power converter of claim 3 wherein the integrator comprises:

an operational amplifier having a non-inverting input coupled to the node, an inverting input for receiving a reference voltage, and an output for providing the error signal; and a capacitor having a first terminal coupled to the non-inverting input of the operational amplifier, and a second terminal coupled to the output of the operational amplifier.

8. The power converter of claim 3 wherein the comparator comprises a hysteretic comparator.

9. A method for use with a power converter having an inductor and a low-side switch for switching the inductor in response to a switching signal to regulate an output voltage of the power converter, comprising:

providing a ripple current in response to an average value of the output voltage;

providing a feedback current in response to an instantaneous value of the output voltage;

summing the ripple current and the feedback current to provide a sum current;

integrating the sum current to provide an error signal;

comparing the error signal and a threshold voltage to provide a comparison output signal; and providing the switching signal in response to the comparison output signal.

10. The method of claim 9, wherein the providing the ripple current comprises:
   determining the average value of the output voltage in response to a signal representative of the switching signal.

11. The method of claim 10, wherein the determining comprises:
   receiving the signal representative of the switching signal at a network comprising a resistor in series with a capacitor.

12. The method of claim 9, wherein the providing the feedback current comprises:
   receiving the output voltage at a common first terminal of a capacitor coupled in parallel to a first resistor; and
   generating the feedback at a common second terminal of the capacitor and the first resistor wherein the common second terminal is coupled to a power supply voltage terminal through a second resistor.

13. The method of claim 9, wherein the comparing comprises:
   comparing the error signal and the threshold voltage using hysteresis according to a high threshold voltage and a low threshold voltage.

* * * * *